United States Patent
Raue

[11] 4,256,900
[45] Mar. 17, 1981

[54] FLUORESCENT AZOLYL BENZOCOUMARIN DYESTUFFS

[75] Inventor: Roderich Raue, Leverkusen, Fed. Rep. of Germany

[73] Assignee: Bayer Aktiengesellschaft, Leverkusen, Fed. Rep. of Germany

[21] Appl. No.: 43,247

[22] Filed: May 29, 1979

Related U.S. Application Data

[63] Continuation of Ser. No. 874,146, Feb. 1, 1978, abandoned.

[30] Foreign Application Priority Data

Feb. 5, 1977 [DE] Fed. Rep. of Germany ....... 2704825

[51] Int. Cl.³ .................... C07D 405/04; C09K 9/02; C09K 11/06
[52] U.S. Cl. .................... 548/262; 252/301.17; 252/301.29; 252/301.27; 252/301.35; 548/159; 548/204; 548/217; 548/374
[58] Field of Search .................... 260/308 R; 548/274, 548/262

[56] References Cited

U.S. PATENT DOCUMENTS

| | | | |
|---|---|---|---|
| 3,271,412 | 9/1966 | Raue et al. | 260/308 B |
| 3,660,424 | 5/1972 | Kabas et al. | 548/374 |
| 3,784,570 | 1/1974 | Schellhammer | 548/374 |
| 3,925,405 | 12/1975 | Boehmke et al. | 260/308 R |
| 3,966,755 | 6/1976 | Schläpfer | 260/308 A |

FOREIGN PATENT DOCUMENTS

43-11244  5/1968  Japan .................... 548/274

*Primary Examiner*—Alton D. Rollins
*Attorney, Agent, or Firm*—Sprung, Felfe, Horn, Lynch & Kramer

[57] ABSTRACT

Compounds of the formula

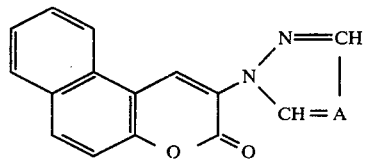

wherein
A represents N or C-Cl, and, in the case where A=N, their quaternization products of the formula

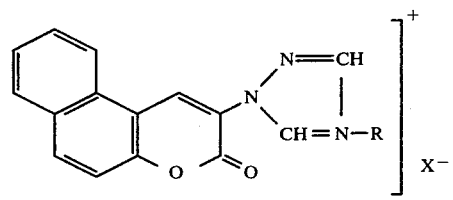

in which
R represents an alkyl, cycloalkyl or aralkyl radical and
X denotes an inorganic or organic acid radical, and it being possible, in the formulae I and II, for the cyclic and acyclic radicals to carry non-chromophoric substituents customary for whiteners, are suitable for the whitening of organic materials, as scintillators and laser dyestuffs.

4 Claims, No Drawings

FLUORESCENT AZOLYL BENZOCOUMARIN DYESTUFFS

This is a continuation, of application Ser. No. 874,146, filed Feb. 1, 1978, now abandoned.

The invention relates to fluorescent dyestuffs, processes for their preparation and their use for whitening organic materials. The new compounds correspond to the formula

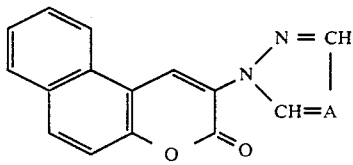

wherein
A represents N or C—Cl,
and, in the case where A=N, for their quaternisation products of the formula

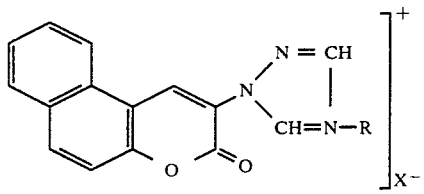

in which
R represents an alkyl, cycloalkyl or aralkyl radical and
X denotes an inorganic or organic acid radical, and it being possible, in the formulae I and II, for the cyclic and acyclic radicals to carry non-chromophoric substituents customary for whiteners.

Amongst these compounds, the quaternisation products of the formula II are preferred, and amongst these, in turn, those in which R denotes an alkyl radical with 1-4 C atoms, which can be substituted by hydroxyl, $C_1$-$C_4$-alkoxy or phenyl-$C_1$-$C_4$-alkoxy groups are preferred.

Suitable substituents are halogen, for example fluorine, chlorine and bromine, especially chlorine; alkyl radicals, in particular those with 1-4 C atoms, which can be monosubstituted by hydroxyl, $C_1$-$C_4$-alkoxy, cyano, carboxyl, $C_1$-$C_4$-alkoxycarbonyl, aminocarbonyl, chlorine or bromine, or trifluoromethyl; cycloalkyl radicals, such as cyclopentyl and cyclohexyl; aralkyl radicals, such as phenyl-$C_1$-$C_4$-alkyl, which can be further substituted in the phenyl nucleus by chlorine, methyl, methoxy or sulpho; aryl radicals, in particular phenyl which is optionally substituted by $C_1$-$C_4$-alkyl, trifluoromethyl, chlorine, bromine, $C_1$-$C_4$-alkoxy or sulpho; alkoxy radicals with 1-4 C atoms or polyethers of the formula

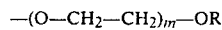
—(O—$CH_2$—$CH_2$)$_m$—OR wherein
R represents hydrogen or $C_1$-$C_4$-alkyl and
m represents an integer from 1-20;
aralkoxy, in particular benzyloxy and phenethyloxy; aryloxy, in particular phenoxy which is optionally substituted by methyl, methoxy, chlorine or sulpho; heterocyclic radicals, such as oxazolyl, imidazolyl and thiazolyl radicals and their benzfusion products; acyl radicals, in particular $C_1$-$C_4$-alkylcarbonyl, $C_1$-$C_4$-alkylsulphonyl and benzoyl or benzenesulphonyl which are optionally substituted by methyl, methoxy, chlorine or sulpho; alkoxycarbonyl radicals with $C_1$-$C_4$-alkoxy groups; carboxamide and aminosulphonyl groups which can be substituted by $C_1$-$C_4$-alkyl, benzyl and phenyl which is optionally further substituted by methyl, methoxy, chlorine or sulpho, and the cyano group and the sulphonic acid radical.

Preferred coumarin compounds correspond to the formula

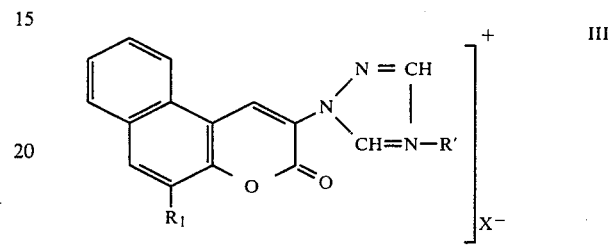

wherein
R' denotes an alkyl radical with 1-4 C atoms which can be substituted by hydroxyl or $C_1$-$C_4$-alkoxy or by phenyl-$C_1$-$C_4$-alkoxy groups,
$R_1$ represents hydrogen, $C_1$-$C_4$-alkoxycarbonyl, aminocarbonyl or mono- or di-$C_1$-$C_4$-alkylaminocarbonyl and
X represents a colourless acid radical.
Amongst these compounds, those in which
R' represents methyl, hydroxyethyl or 2-hydroxypropyl,
$R_1$ represents hydrogen and
X represents a colourless acid radical,
are in turn to be particularly singled out.

The coumarin compounds according to the invention can be prepared in a manner which is in itself known by condensation of 2-hydroxy-1-naphthaldehyde, or its substitution products, with 1,2,4-triazolyl-1-acetic acid or with 4-chloropyrazolyl-1-acetic acid in the presence of sodium acetate and acetic anhydride. Instead of 1,2,4-triazolyl-1-acetic acid or of 4-chloro-pyrazolyl-1-acetic acid, it is possible to react their nitriles or methyl or ethyl esters with 2-hydroxy-1-naphthaldehyde or its derivatives. The reaction is carried out in a manner which is in itself known in alcoholic solution with the addition of alkaline catalysts, such as KOH, piperidine or pyrrolidine.

Suitable derivatives of 2-hydroxy-1-naphthaldehyde are, inter alia, 1-formyl-2-hydroxy-naphthalene-3-carboxylic acid methyl ester, 1-formyl-2-hydroxy-naphthalene-3-carboxylic acid ethyl ester, 1-formyl-2-hydroxy-naphthalene-3-carboxylic acid butyl ester, 1-formyl-2-hydroxy-naphthalene-3-carboxylic acid, 1-formyl-2-hydroxy-naphthalene-3-carboxylic acid dimethylamide, 1-formyl-2-hydroxy-naphthalene-3-carboxylic acid diethylamide, 1-formyl-2-hydroxy-naphthalene-3-carboxylic acid anilide, 1-formyl-2-hydroxy-3-methoxy-naphthalene, 1-formyl-2-hydroxy-6-methoxy-naphthalene, 1-formyl-2-hydroxy-3-chloro-naphthalene, 1-formyl-2-hydroxy-6-chloro-naphthalene, 1-formyl-2-hydroxy-3-bromo-naphthalene, 1-formyl-2-hydroxy-6-bromo-naphthalene, 1-formyl-2-hydroxy-3-cyano-naphthalene, 1-formyl-2-hydroxy-naphthalene-6-sulphonic acid, 1-formyl-2-hydroxy-3-benzoxazol-2-yl-naphthalene, 1-formyl-2-hydroxy-3-benzthiazol-2-yl-naphthalene and 1-formyl-2-hydroxy-3-[1-methyl-benzimidazol-2-yl]-naphthalene. The coumarin compounds obtained by condensation of 1,2,4-triazolyl-1-acetic acid with 2-hydroxynaphthaldehyde and its substitution products can optionally be converted into quaternisation products of the formula II with alkylating agents in the presence of an inert solvent.

Suitable inert solvents are, for example, benzene, toluene, xylene, chlorobenzene, dichlorobenzene, trichlorobenzenes, chlorotoluenes, chloroxylenes, acetone, dioxane and tetrahydrofurane.

Suitable solvents for alkylation using alkylene oxides are lower carboxylic acids, such as formic acid, acetic acid and propionic acid.

Suitable alkylating agents are dimethyl sulphate, diethyl sulphate, dibutyl sulphate, methyl iodide, ethyl iodide, methyl chloride, ethyl chloride, butyl bromide, benzyl chloride, 4-toluenesulphonic acid methyl ester or ethyl ester, ethylene oxide, propylene oxide, 1,2-butylene oxide, epichlorohydrin, methoxy-propylene oxide, ethoxy-propylene oxide, butoxy-propylene oxide, benzyloxy-propylene oxide, phenoxypropylene oxide, allyl chloride, allyl bromide, allyloxypropylene oxide, vinyloxirane, 2,3-epoxy-propanol (glycidol), ethylene chlorohydrin and chloropropanol.

Substituents can also be subsequently introduced into the coumarin compounds, for example by reacion with bromine in glacial acetic acid or sulphuric acid or by reaction with oleum, in order to introduce a sulphonic acid group.

Because of their absorption in the ultraviolet region and their fluorescence, the compounds according to the invention are suitable for whitening the most diverse synthetic, semi-synthetic and natural organic high-molecular materials.

Coumarin compounds of the type according to the invention which contain an acid group, in particular the sulphonic acid group, can be used, above all, for brightening natural fibre materials, for example wool, whilst coumarin compounds which contain basic groups, for example tertiary amino groups or quaternary ammonium groups, in particular those of the formula II, are suitable for brightening materials consisting of polyacrylonitrile or cellulose esters.

Coumarin compounds of the above formula I which contain neither acid groups nor basic groups and as a result of this are sparingly soluble in water, are suitable for brightening materials consisting of synthetic polycondensation products, such as polyesters, polyamides and polyurethanes, and for brightening materials consisting of polyacrylonitrile, polystyrene or cellulose esters.

The optical brighteners of the present invention can be used in the customary manner, for example in the form of solutions in water or in organic solvents or in the form of aqueous dispersions, it being possible to use, inter alia, condensation products of naphthalenesulphonic acids and formaldehyde as dispersing agents.

The brighteners can also be added to spinning compositions and casting compositions which are used for the manufacture of fibres, filaments, films and other structures.

The amount of the new whiteners to be used according to the invention, relative to the material to be whitened, can vary within wide limits. In certain cases, a distinct and durable effect can be achieved even with very small amounts, for example amounts of 0.001% by weight. However, amounts of up to about 0.5% by weight and more can also be employed. For most practical purposes, amounts between 0.01 and 0.2% by weight are preferably of interest. The new compounds being used as whiteners can also be employed, for example, as follows: (a) mixed with dyestuffs or pigments or as an additive to dyebaths, printing pastes, discharge pastes or reserve pastes; and furthermore also for the after-treatment of dyeings, prints or discharge prints; (b) mixed with so-called carriers, antioxidants, light-stabilisers, heat-stabilisers and chemical bleaching agents or as an additive to bleaching baths; (c) mixed with crosslinking agents or finishing agents, such as starch or synthetically accessible finishing agents; and (d) in combination with detergents.

The compounds of the formula initially indicated can be used as scintillators for various purposes of a photographic nature, such as for electrophotographic reproduction or for supersensitisation. They are also suitable as laser dyestuffs when they are employed in a dyestuff laser apparatus pumped by a nitrogen laser.

In the case of treatment of a number of fibre substrates, for example of polyester fibres, with the whiteners of the formula I according to the invention, the appropriate procedure is to impregnate these fibres with the aqueous dispersions of the whiteners at temperatures below 75° C., for example at room temperature, and to subject the fibres to a dry heat treatment at a temperature above 100° C.

The brighteners of the formula II are distinguished, in particular, by stability towards bleaching baths containing chlorite. They can be used for the one-bath bleaching and brightening of polyacrylonitrile materials.

The coumarin compounds which contain a heterocyclic radical in the 3-position and which have hitherto been proposed as brightening agents do not possess these advantageous properties to the same extent.

In the Examples which follow, parts by weight bear the same relationship to parts by volume as grams bear to milliliters.

EXAMPLE 1

37.9 parts by weight of 2-hydroxy-1-naphthaldehyde, 23.0 parts by weight of 1,2,4-triazolyl-1-acetic acid and 14.5 parts by weight of anhydrous sodium acetate are warmed with 90 parts by weight of acetic anhydride to a bath temperature of 160° C. in the course of 1 hour and the mixture is stirred for 7 hours at an external temperature of 160° C. The reaction mixture is now allowed to cool to 80° C. and 150 parts by volume of methanol are added at a rate such that the reaction mixture boils moderately under reflux. After boiling under reflux for one hour, the reaction mixture is cooled to 10° C. and the precipitate is filtered off and washed with 40 parts by volume of cold methanol and then with 500 parts by volume of water. This gives 31.9 parts by weight of 3-(1,2,4-triazol-1-yl)-5,6-benzocoumarin in the form of colourless crystals with a melting point of 236°–237° C.

On polyester fibre material the compound exhibits good brightening effects when dyed by the exhaustion process and the high temperature process.

Polyacrylonitrile fibres are brightened very well on dyeing in the presence of sodium chlorite.

EXAMPLE 2

19 parts by weight of 2-hydroxy-1-naphthaldehyde, 14.6 parts by weight of 4-chloro-pyrazolyl-1-acetic acid and 7.3 parts by weight of sodium acetate are warmed with 45 parts by weight of acetic anhydride to a bath temperature of 160° C. in the course of 1 hour and the mixture is stirred for 6 hours at this temperature. After cooling to 80° C., 75 parts by volume of methanol are added, the mixture is heated under reflux for 1 hour and the reaction product is cooled to 10° C. The coumarin compound which has formed is then filtered off and washed with 20 parts by volume of ice-cold methanol and then with 250 parts by volume of water. The dried crude product is recrystallised from dioxane, with the addition of active charcoal. This gives 11.6 parts by weight of 3-(4-chloropyrazol-1-yl)-5,6-benzocoumarin; melting point 220°–221° C. The coumarin compound gives very good brightening effects on polyesters by the exhaustion process and the high temperature process.

Polyacrylonitrile materials are brightened very well when dryed in the presence of sodium chlorite.

If 1-formyl-2-hydroxy-naphthalene-3-carboxylic acid ethyl ester is used instead of the 2-hydroxy-1-naphthaldehyde and the procedure is otherwise the same, a coumarin compound which gives good brightening effects on polyesters and polyacrylonitrile is also obtained.

EXAMPLE 3

53.8 parts by weight of 1-formyl-2-hydroxy-naphthalene-3-carboxylic acid ethyl ester, 23.0 parts by weight of 1,2,4-triazolyl-1-acetic acid and 14.5 parts by weight of anhydrous sodium acetate are reacted with 90 parts by weight of acetic anhydride in the manner described in Example 1.

Recrystallisation from dioxane gives 29.6 parts by weight of 3-(1,2,4-triazol-1-yl)-5,6-benzocoumarin-8-carboxylic acid ethyl ester; melting point 263°–264° C.

The coumarin compound brightens polyesters well by the high temperature process in the presence of sodium chlorite or by the thermosol process.

If one of the aldehydes which follow is reacted with 1,2,4-triazolyl-1-acetic acid in the manner described above instead of the 1-formyl-2-hydroxy-naphthalene-3-carboxylic acid ethyl ester, coumarin compounds which give good brightening effects on polyester materials are also obtained; 1-formyl-2-hydroxy-naphthalene-3-carboxylic acid methyl ester, 1-formyl-2-hydroxy-naphthalene-3-carboxylic acid butyl ester, 1-formyl-2-hydroxy-naphthalene-3-carboxylic acid dimethylamide, 1-formyl-2-hydroxy-naphthalene-3-carboxylic acid diethylamide, 1-formyl-2-hydroxy-3-cyanonaphthalene and 1-formyl-2-hydroxy-3-[benzoxazol-2-yl]-naphthalene.

EXAMPLE 4

31.9 parts by weight of 3-(1,2,4-triazol-1-yl)-5,6-benzocoumarin are warmed with 295 parts by volume of chlorobenzene to 100° C., 29.0 parts by weight of dimethyl sulphate are added dropwise and the reaction mixture is warmed further to 110° C. After stirring for 4 hours at 110° C., the reaction mixture is cooled to a temperature below 10° C. and is stirred for 3 hours at this temperature. The quaternised coumarin compound is then filtered off, washed with 100 parts by volume of acetone, which has first been cooled to 10° C., and dried at 50° C. in vacuo. This gives 46.4 parts by weight of a compound of the formula

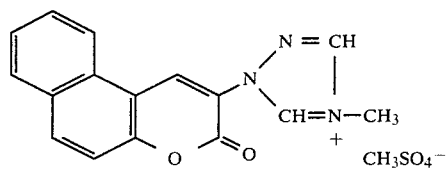

with a melting point of 249°–250° C., with decomposition.

Polyacrylonitrile fibres are brightened very well by this compound using the exhaustion process in the presence of sodium chlorite.

If one of the coumarin compounds, the preparation of which is described in Example 3, is used instead of the 3-(1,2,4-triazol-1-yl)-5,6-benzocoumarin and the procedure is otherwise the same, cationic coumarin compounds which give very good brightening effects by the exhaustion process in the presence of sodium chlorite are also obtained.

EXAMPLE 5

22.7 parts by weight of 3-(1,2,4-triazol-1-yl)-5,6-benzocoumarin are stirred with 200 parts by volume of chlorobenzene, 30 parts by weight of methyl iodide are added dropwise and the reaction mixture is warmed to 110° C. After stirring for 3 hours at 110° C., a further 15 parts by weight of methyl iodide are added dropwise and the reaction mixture is stirred for 17 hours at 110° C. Chlorobenzene and excess methyl iodide are then distilled off with steam, whereupon the sparingly soluble iodide precipitates. The cationic coumarin compound is purified by recrystallising from 2,000 parts by volume of water.

It gives very good brightening effects on polyacrylonitrile fibres by the exhaustion process in the presence of sodium chlorite.

EXAMPLE 6

20 parts by weight of 3-(1,2,4-triazol-1-yl)-5,6-benzocoumarin are warmed with 200 parts by volume of chlorobenzene to 100° C. and 22.5 parts by weight of diethyl sulphate are added dropwise. The reaction mixture is heated under reflux at a bath temperature of 150° C. and an internal temperature of 135° C. for 4 hours. A further 7.5 parts by weight of diethyl sulphate are then added and heating under reflux is continued for a further 2 hours. After cooling, the crystalline quaternary compound is filtered off. It is dissolved in 1,500 parts by volume of water, clarified with active charcoal and salted out with 150 parts by weight of sodium chloride. This gives 24.6 parts by weight of the cationic coumarin compound of the formula

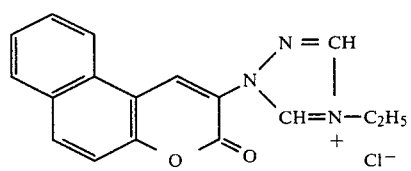

which brightens polyacrylonitrile very well by the exhaustion process in the presence of sodium chlorite.

If one of the coumarin compounds, the preparation of which is described in Example 3, is used instead of the starting material employed here and the procedure is otherwise the same, cationic coumarin compounds which brighten polyacrylonitrile very well by the exhaustion process in the presence of sodium chlorite are also obtained.

EXAMPLE 7

23.7 parts by weight of 3-(1,2,4-triazol-1-yl)-5,6-benzocoumarin are warmed with 215 parts by volume of chlorobenzene to 100° C., 32 parts by weight of toluenesulphonic acid methyl ester are added dropwise and the reaction mixture is heated to the boil under reflux for 5 hours. A further 10.6 parts by weight of toluenesulphonic acid methyl ester are then added and the mixture is heated under reflux for a further 2 hours. After cooling, the cationic coumarin compound is filtered off. For purification, it is dissolved in 2,000 parts by volume of water, clarified with active charcoal and salted out with 200 parts by weight of sodium chloride. This gives 28.2 parts by weight of a colourless crystalline compound which brightens polyacrylonitrile very well by the exhaustion process in the presence of sodium chlorite.

EXAMPLE 8

20 parts by weight of 3-(1,2,4-triazol-1-yl)-5,6-benzocoumarin are warmed with 50 parts by weight of p-toluenesulphonic acid ethyl ester to 150° C. The progress of the quaternisation is followed by thin layer chromatography; after 2 hours no further starting material is present. The reaction mixture is discharged onto 2,000 parts by volume of water, the mixture is heated to the boil and clarified with active charcoal and the cationic coumarin compound is salted out with 150 parts by weight of sodium chloride. After subsequently stirring for several hours, it is filtered off and dried. Using the compound thus obtained, fibre materials consisting of polyacrylonitrile are brightened very well by the exhaustion process in the presence of sodium chlorite.

EXAMPLE 9

23.7 parts by weight of 3-(1,2,4-triazol-1-yl)-5,6-benzocoumarin are warmed with 150 parts by weight of butyl bromide to 150° C. in an autoclave with a capacity of 250 parts by volume for 24 hours. A pressure of 6 atmospheres gauge is thereby set up. After cooling, the reaction product is heated to the boil with 2,000 parts by volume of water, the unreacted coumarin compound is filtered off, the solution is then clarified with active charcoal and the product is salted out with 200 parts by weight of sodium chloride. This gives 23.6 parts by weight of a cationic coumarin compound which carries a butyl group in the 4-position on the triazolyl radical. It brightens fibre materials consisting of polyacrylonitrile very well by the exhaustion process in the presence of sodium chlorite.

EXAMPLE 10

20.5 parts by weight of 3-(1,2,4-triazol-1-yl)-5,6-benzocoumarin are warmed with 50 parts by weight of benzyl chloride to 160° C. and the mixture is stirred for 18 hours at this temperature. The excess benzyl choride is then distilled off with steam, the suspension is made up to 1,000 parts by volume with water and heated to the boil and the nonquaternised coumarin compound is filtered off. The filtrate is clarified with active charcoal and the product is salted out with 100 parts by weight of sodium chloride. This gives a cationic coumarin compound which carries a benzyl group in the 4-position of the triazolyl radical. It brightens fibre materials consisting of polyacrylonitrile very well by the exhaustion process in the presence of sodium chlorite.

EXAMPLE 11

30.4 parts by weight of 3-(1,2,4-triazol-1-yl)-5,6-benzocoumarin are stirred with 50 parts by weight of ethylene chlorohydrin for 22 hours at a bath temperature of 130° C. After cooling, the reaction mixture is discharged onto 1,000 parts by volume of water, the solution is heated to the boil unreacted starting material is filtered off, the filtrate is clarified with active charcoal and, after cooling, the product is salted out with 100 parts by weight of sodium chloride. The cationic coumarin compound thus obtained carries a hydroxyethyl group in the 4-position of the triazolyl radical. It brightens fibre materials consisting of polyacrylonitrile very well by the exhaustion process in the presence of sodium chlorite.

EXAMPLE 12

27.6 parts by weight of 3-(1,2,4-triazol-1-yl)-5,6-benzocoumarin are suspended in 150 parts by weight of glacial acetic acid and ethylene oxide is passed in whilst the temperature slowly rises. After 2 hours, the temperature has reached 60° C. and the starting material has dissolved. Ethylene oxide is passed in for a further 2 hours at 60° C., after which only traces of starting material can still be detected in the thin layer chromatogram. After cooling, the reaction mixture is discharged onto 700 parts by volume of water and the cationic coumarin compound is salted out with 100 parts by weight of sodium chloride. After further stirring for several hours, the product is filtered off and dried in vacuo. This gives 35.8 parts by weight of the cationic benzocoumarin compound, which carries a hydroxyethyl group in the 4-position of the triazolyl radical. It brightens polyacrylonitrile fibre materials very well by the exhaustion process in the presence of sodium chlorite, using an amount of 0.1–0.2%.

If those 3-triazolyl-5,6-benzocoumarin compounds, the preparation of which is described in Example 3, are used instead of the starting material employed here and the procedure is otherwise the same, valuable brightening agents are also obtained.

EXAMPLE 13

24 parts by weight of 3-(1,2,4-triazol-1-yl)-5,6-benzocoumarin are warmed with 120 parts by weight of glacial acetic acid to 60° C. and 24 parts by weight of propylene oxide are added dropwise. After stirring the mixture for 5 hours at 60° C., a further 24 parts by weight of propylene oxide are added dropwise and the reaction mixture is stirred for a further 18 hours at 60° C. Only traces of starting material can still be detected in the thin layer chromatogram. The reaction mixture is discharged onto 1,000 parts by volume of water, the mixture is heated to the boil and clarified with active charcoal and, after cooling the solution, the cationic coumarin compound is salted out with 120 parts by weight of sodium chloride. The suspension is stirred overnight and the end product is then filtered off and dried in vacuo. This gives 31.4 parts by weight of a cationic coumarin compound which carries a 2-hydroxypropyl group in the 4-position of the triazolyl radical.

Using this compund, polyacrylonitrile fibre materials are brightened very well by the exhaustion process in the presence of sodium chlorite.

EXAMPLE 14

29.4 parts by weight of 3-(1,2,4-triazol-1-yl)-5,6-benzocoumarin are warmed in 100 parts by weight of glacial acetic acid to 60° C., 40 parts by weight of 1,2-butylene oxide are added dropwise and the reaction mixture is stirred for 4 hours at 60° C. A further 20 parts by weight of butylene oxide are then added and the mixture is again stirred for 19 hours at 60° C. The reaction mixture is then discharged onto 1,000 parts by volume of water, the mixture is heated to the boil and the starting material is filtered off. The filtrate is clarified with active charcoal and, after cooling, the product is salted out with 110 parts by weight of sodium chloride. The suspension is stirred overnight and the cationic coumarin compound is filtered off and dried in vacuo. This gives 27.1 parts by weight of this compound, which carries a 2-hydroxybutyl group in the 4-position of the triazolyl radical.

If allyloxypropylene oxide, epichlorohydrin, vinyloxirane or glycidol is employed instead of the 1,2-butylene oxide used in the above Example and the procedure is otherwise the same, cationic coumarin compounds which brighten polyacrylonitrile materials very well by the exhaustion process in the presence of sodium chlorite are also obtained.

EXAMPLE 15

28.4 parts by weight of 3-(1,2,4-triazol-1-yl)-5,6-benzocoumarin are reacted with 150 parts by weight of allyl bromide in an autoclave with a capacity of 250 parts by volume for 8 hours at 150° C. A pressure of 7–9 atmospheres gauge is thereby set up. After cooling, the reaction product is warmed to the boil with 1,000 parts by volume of water and unreacted starting material is filtered off. The filtrate is clarified with active charcoal and, after cooling, the product is salted out with 100 parts by weight of sodium chloride. The suspension is stirred overnight and the reaction product is filtered off and dried in vacuo. This gives 22.2 parts by weight of a cationic coumarin compound which carries an allyl radical in the 4-position of the triazolyl radical. Fibre materials consisting of polyacrylonitrile are brightened very well by this compound using the exhaustion process in the presence of sodium chlorite.

EXAMPLE 16

27.9 parts by weight of 3-(1',2',4°-triazol-1'-yl)-5,6-benzocoumarin are stirred with 100 parts by weight of concentrated $H_2SO_4$ at 20° C. until a clear solution has formed. 20 parts by weight of 65% strength oleum are then added dropwise and the mixture is stirred for a further 2 hours at 20° C. The reaction mixture is then discharged onto 500 parts by volume of ice-water and the coumarinsulphonic acid is filtered off and washed with 500 parts by volume of 20% strength sodium chloride solution. For purification, it is dissolved in 1,200 parts by volume of water and clarified with active charcoal. The coumarinsulphonic acid reprecipitates on cooling and is filtered off and washed with 500 parts by volume of 20% strength sodium chloride solution. This gives 41.2 parts by weight of the monosulphonic acid of 3-(1,2,4-triazol-1-yl)-5,6-benzocoumarin. Distinct brightening effects are obtained on polyamide fibres and on wool by the exhaustion process with sodium dithionite.

EXAMPLE 17

30.2 parts by weight of cationic coumarin compound, the preparation of which is described in Example 4, are dissolved in 100 parts by weight of concentrated $H_2SO_4$ at 20° C. 20 parts by weight of 65% strength oleum are added dropwise and the reaction mixture is warmed to 40° C. and stirred for 4 hours at 40° C. It is then discharged onto 1,000 arts by volume of water, the suspension of the coumarinsulphonic acid is filtered and the product is washed with 500 parts by volume of 20% strength sodium chloride solution. For purification, the coumarinsulphonic acid is recrystallised from 2,000 parts by volume of water. Distinct brightening effects are obtained on wool and polyamide.

EXAMPLE 18

A fabric consisting of polyethylene glycol terephthalate filaments is treated in the ratio of 1:20 in an aqueous liquor which contains 1 g/ltr. of sodium chlorite and 0.05 g/ltr. of one of the brightening agents indicated in Examples 1, 2 or 3, in the dispersed form. The bath is brought to 125° C. in a high temperature apparatus in the course of 45 minutes and the textile material is treated at this temperature for a further 45 minutes. After rinsing and drying, the fabric thus treated exhibits a very good whitening effect which is substantially more brilliant than that which is achieved by treatment with sodium chlorite alone.

EXAMPLE 19

100 parts by weight of polystyrene and 0.1 part by weight of one of the brightening agents indicated in Example 1, 2 or 3, are melted at 210° C. for 20 minutes, with the exclusion of air. After cooling, an optically brightened polystyrene composition is obtained.

EXAMPLE 20

Polyacrylonitrile fibres are introduced into an aqueous bath, in a liquor ratio of 1:40, which contains, per liter, 1 g of oxalic acid, 1 g of sodium chloride and 0.1 g of one of the brightening agents described in Examples 4–15. The bath is then heated to the boil in the course of 20 minutes and kept at this temperature for 45–60 minutes. The polyacrylonitrile fibres are then rinsed and dried. The fibres are brightened in an outstanding manner.

EXAMPLE 21

A stock solution is prepared from 10 parts by weight of polyacrylonitrile, 80 parts by weight of dimethylformamide and 10 parts by weight of the brightening agent indicated in Example 4, and this is added to a customary polyacrylonitrile spinning solution in an amount such that the concentration of the brightening agent in the spun polyacrylonitrile material is 0.25%. The spinning solution is then spun in the customary manner and the fibre material formed is bleached in a bath containing sodium chlorite. The whitening effect thus obtained is outstanding.

I claim:

1. A fluorescent dyestuff selected from the group consisting of

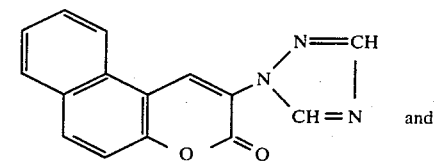
and
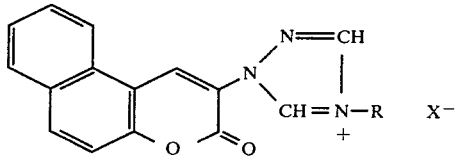
in which
R is $C_1$–$C_4$-alkyl, or $C_1$–$C_4$ alkyl substituted by OH, $C_1$–$C_4$-alkoxy or phenyl-$C_1$–$C_4$-alkoxy, and
X is an inorganic or organic acid radical.
2. A compound according to claim 1 of the formula
3. A compound according to claim 1 of the formula
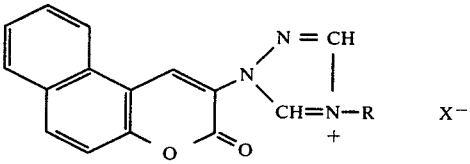
4. A compound according to claim 3, in which R is methyl, hydroxethyl or 2-hydroxypropyl.
* * * * *